US010089994B1

(12) United States Patent
Radzishevsky

(10) Patent No.: US 10,089,994 B1
(45) Date of Patent: Oct. 2, 2018

(54) ACOUSTIC FINGERPRINT EXTRACTION AND MATCHING

(71) Applicant: Alex Radzishevsky, Haifa (IL)

(72) Inventor: Alex Radzishevsky, Haifa (IL)

(73) Assignee: Alex Radzishevsky, Haifa (IL)

( * ) Notice: Subject to any disclaimer, the term of this patent is extended or adjusted under 35 U.S.C. 154(b) by 0 days.

(21) Appl. No.: 15/893,718

(22) Filed: Feb. 12, 2018

Related U.S. Application Data

(60) Provisional application No. 62/617,311, filed on Jan. 15, 2018.

(51) Int. Cl.

| | |
|---|---|
| ***G10L 25/51*** | (2013.01) |
| ***G10L 15/02*** | (2006.01) |
| ***G10L 19/018*** | (2013.01) |
| ***G10L 21/038*** | (2013.01) |

(52) U.S. Cl.
CPC .......... *G10L 19/018* (2013.01); *G10L 21/038* (2013.01); *G10L 25/51* (2013.01)

(58) Field of Classification Search
CPC ..... G10L 19/018; G10L 21/038; G10L 25/51; G10L 15/02; G10L 25/48; G06K 9/00523; G10H 2210/06; G10H 2240/131
USPC .......... 700/94; 704/243, 205, 206, 244, 245, 704/500, 270
See application file for complete search history.

(56) References Cited

U.S. PATENT DOCUMENTS

| | | | |
|---|---|---|---|
| 6,990,453 B2 | 1/2006 | Wang | |
| 7,379,875 B2 * | 5/2008 | Burges | G06F 17/30743 700/94 |
| 7,516,074 B2 | 4/2009 | Bilobrov | |
| 8,116,514 B2 | 2/2012 | Radzishevsky | |
| 8,140,331 B2 * | 3/2012 | Lou | G11B 27/28 704/205 |
| 9,093,120 B2 | 7/2015 | Bilobrov | |
| 2006/0075237 A1 | 4/2006 | Seo | |
| 2009/0083228 A1 | 3/2009 | Shatz | |

OTHER PUBLICATIONS

Chandrasekhar, V., Sharifi, M., Ross, D.: Survey and evaluation of audio fingerprinting schemes for mobile query-by-example applications. International Conference on Music Information Retrieval (ISMIR), 2011.
Lorenzo, A.: Audio Fingerprinting, Master Thesis, 2011, Universitat Pompeu Fabra, Barcelona.
Haitsma, J., Kalker, T.: A highly robust audio fingerprinting system. In Proc. of International Conference on Music Information Retrieval (ISMIR), Paris, France, 2002.

(Continued)

*Primary Examiner* — Melur Ramakrishnaiah

(57) ABSTRACT

A method of acoustic matching of audio recordings by means of acoustic fingerprinting is disclosed. An acoustic fingerprint is extracted from a fragment of an audio recording. The fingerprint represents a highly discriminative compact digital digest (acoustic hash) of the acoustic recording and consists of smaller digital entities called acoustic sub-fingerprints (acoustic hash-words), computed from perceptually essential properties of the acoustic recording. Two acoustic fingerprints corresponding to two audio fragments are matched to determine degree of acoustic similarity of the two audio fragments.

19 Claims, 11 Drawing Sheets

(56) References Cited

OTHER PUBLICATIONS

Sukittanon, S., Atlas, L., Pitton, J.: Modulation scale analysis for content identification. UWEEE Technical Report UWEETR-2003-0025, 2003.
Baluja, S., Covell, M.: Content fingerprinting using wavelets. In proc. of European Conference on Visual Media Production (CVMP), 2006.
Baluja, S., Covell, M.: Audio fingerprinting: combining computer vision & data stream processing. IEEE ICASSP, 2007.
Ke, Y., Hoiem, D., Sukthankar, R.: Computer vision for music identification. In proc. of IEEE Conference on Computer Vision and Pattern Recognition (CVPR), 2005.
Wang, A.L.: An Industrial-strength audio search algorithm, In proc. of International Conference on Music Information Retrieval (ISMIR), 2003.

* cited by examiner

ACOUSTIC FINGERPRINT EXTRACTION AND MATCHING

CROSS REFERENCE TO RELATED APPLICATIONS

This application claims the priority benefit of U.S. provisional application 62/617,311, "ACOUSTIC FINGERPRINT EXTRACTION AND MATCHING", filed Jan. 15, 2018; the entire contents of which are incorporated herein by reference.

BACKGROUND OF THE INVENTION

Field of the Invention

Systems and methods related to acoustic fingerprinting and determining degrees of acoustic similarity of audio recordings.

Description of the Related Art

Acoustic (audio) fingerprinting is a signal processing approach and a family of digital signal processing algorithms designed to allow quantitative estimation of perceptual similarity of audio recordings based on their compact digital acoustic fingerprints ("acoustic hashes"). One of the most common applications for the acoustic fingerprinting is automatic identification of unknown audio recordings by means of pre-calculated fingerprint databases.

An acoustic fingerprint is usually a compact digital digest (summary, hash) of an acoustic recording representing a set of smaller digital entities, so called "sub-fingerprints" or "hash-words", computed from perceptually essential properties of the acoustic recording.

In general, hash functions allow comparison of large objects by comparing their respective compact hash values. The same concept is used in acoustic fingerprinting. Two audio recordings can be matched by comparing their respective acoustic fingerprints (acoustic hashes). Therefore, in order to allow fast, reliable and error-free matching of acoustic recordings, a "good" fingerprinting system has to produce:

- representative and discriminative fingerprints reducing error rate and avoiding wrong matching results
- robust fingerprints, invariant to various real-world audio transformations and distortions (such as AD/DA conversion, lossy compression and transcoding, re-transmission, playback speed variation, etc.)
- compact fingerprints reducing database size and amount of information that has to be transferred and operated in order to identify and match the audio
- high-entropy fingerprints minimizing false positive detections during the search process in large data-bases.

A number of different algorithms and techniques have been developed to achieve the above-mentioned generic tasks and construct a "good" audio fingerprinting system. A good comparison survey of some of the leading algorithms is provided in Chandrasekhar (Chandrasekhar, V., Sharifi, M, Ross, D.: *Survey and evaluation of audio fingerprinting schemes for mobile query-by-example applications. International Conference on Music Information Retrieval* (*ISMIR*), 2011) and Lorenzo (Lorenzo, A.: *Audio Fingerprinting, Master Thesis,* 2011, Universitat Pompeu Fabra, Barcelona).

The majority of the prior art algorithms are based on a generic idea of numerically representing a sound spectrogram in a compact form, which would be resistant to various typical audio transformations.

Haitsma et al. (Haitsma, Kalker, T: *A highly robust audio fingerprinting system. In Proc. Of International Conference on Music Information Retrieval* (*ISMIR*), Paris, France, 2002) propose fingerprinting based on short-term sampling of the signal spectrum using differential coding. This method uses a short-time Fourier Transform (STFT) to extract multi-bit sub-fingerprint for every short interval of the indexed audio signal. The audio signal is first segmented into overlapping frames weighted with Hamming window and is then transformed into the frequency domain using FFT. The obtained spectrum of every frame is segmented into several non-overlapping, logarithmically spaced frequency bands. The sub-fingerprints are then extracted from the band data of the specific frame by means of differential coding of adjacent band spectral energies along time and/or frequency axis.

This method results in quite robust fingerprints, but falls short on time-scaled audio signals due to shifting of energies occurring in the spectrum as the result of the signal speed variation.

Several improvements of Haitsma's original approach have been developed to address its shortcomings.

In particular, a modified algorithm (Seo, I, Haitsma, I, Kalker, A.: Fingerprinting multimedia contents. US patent publication US 2006/0075237, 2006) discloses fingerprint extraction in the scale-invariant Fourier-Mellin domain. This modified algorithm introduces additional operations on the signal transformed to the time-frequency domain, such as logarithmic scale mapping of the spectrum with consecutive cepstrum calculation using additional, second Fourier transform.

Some other methods propose sub-fingerprint extraction based on long-term spectrogram analysis algorithms.

One long-term analysis algorithm invention's by Sukittanon and described in (Sukittanon, S., Atlas, L., Pitton, J.: *Modulation scale analysis for content identification. UWEEE Technical Report UWEETR*-2003-0025, 2003) is based on estimation of modulation frequencies in the signal. In the invention's algorithm, a modulation spectrum is computed from the signal spectrogram by applying a second transform (a number of continuous wavelet transforms) along the temporal row (horizontal axis) of the spectrogram.

Wang et al (Wang, A., Smith, J.: System and methods for recognizing sound and music signals in high noise and distortion. U.S. Pat. No. 6,990,453, 2001), (Wang, A.: An industrial-strength audio search algorithm. In proc. of International Conference on Music Information Retrieval (ISMIR), 2003) invention's a combinatorial long-term fingerprint extraction approach. In the invention's method, the sub-fingerprints are extracted by linking a salient spectrum points (spectral peaks) into groups to form sub-fingerprints.

Baluj a's technique (Baluja, S., Covell, M: *Content fingerprinting using wavelets. In proc. of European Conference on Visual Media Production* (*CVMP*), 2006), (Baluja, S., Covell, M: *Audio fingerprinting: combining computer vision & data stream processing. IEEE ICASSP,* 2007) uses computer vision approaches and is based on deriving fingerprints by additionally decomposing signal spectrogram be means of wavelet transform and using the obtained decomposition coefficients to form sub-fingerprints.

Ke at al (Ke, Y., Hoiem, D., Sukthankar, R.: *Computer vision for music identification. In proc. of IEEE Conference on Computer Vision and Pattern Recognition* (*CVPR*), 2005) uses another computer vision technique and applies a special set of filters to the spectrogram (treated as 2D image) to derive resistant sub-fingerprints from it.

Bilobrov (Bilobrov, S.: Audio fingerprint extraction by scaling in time and resampling. U.S. Pat. No. 9,093,120, 2011) implements a long-term fingerprinting method in which signal spectrogram is divided into frequency bands, signals in frequency bands are rescaled as function of the frequency, then resampled, and sub-fingerprints are derived from the resampled signals directly or by applying an additional FFT, DCT, DHT or DWT transform to the resampled band signals.

In another method proposed by Bilobrov (Bilobrov, S.: Extraction and matching of characteristic fingerprints from audio signals. U.S. Pat. No. 7,516,074, 2009), the frequency band signals are resampled in a non-linear timescale.

The above methods and their variations are used to provide a robust numerical representation of an audio signal at its particular granular time-locations, usually with fine time-resolution. The produced sub-fingerprints (hash-words) are then combined into sets called fingerprints.

In these prior art methods, the produced fingerprints usually tie the sub-fingerprint hash-words to their particular locations in the source audio signal by explicitly storing the corresponding temporal information in the produced fingerprint or by storing the sub-fingerprints in sequential order corresponding to their time-locations in the source audio. This is mainly done in order to increase accuracy of fingerprints matching and to reduce error-rate of audio identification using large databases.

For example, in Wang's system (ibid) the feature-vectors are stored together with information about their relative location in the audio stream. This method improves fingerprint matching accuracy by allowing testing correspondence of the timing information of equivalent feature-vectors.

Shatz et al (Shatz, A., Wexler, Y., Cohen, R. A., Raudnitz, D.: Matching of modified visual and audio media, US patent publication US 2009/0083228, 2009) describes a method in which matching of objects is performed by finding equivalent feature-vectors in one query frame and then testing additional query frames that follow the previously tested frames for increased matching accuracy.

BRIEF SUMMARY OF THE INVENTION

The present invention discloses an improved system and method of producing robust and highly discriminative digital fingerprints of acoustic signals. Methods for matching of two acoustic signals by matching their corresponding acoustic fingerprints are also described. The invention's fingerprinting system does not carry and does not make use of any temporal information about location of sub-fingerprints relative to the source audio and to each other, and does not rely on succession of sub-fingerprints (hash-words) in the fingerprints, thus allowing the invention to produce compact "timeless" fingerprints and to perform fast fingerprint matching with low error rate.

An additional goal of the invention was to design a fingerprint extraction algorithm producing fingerprints that would be invariant under the sound transformation previously introduced by the AWT audio watermarking algorithm disclosed in Radzishevsky (Radzishevsky, A.: Water mark embedding and extraction. U.S. Pat. No. 8,116,514, 2008). Audio watermarking is generally a process of embedding (hiding) a secret and imperceptible digital signature inside acoustic content so that this information cannot be removed without degrading the original audio quality. The fingerprinting system and methods in this disclosure, much like the human auditory system, are mostly insensitive to the sound transformation introduced by the AWT watermarking. As a result, matching of two audio signals watermarked by AWT with different watermark payloads results in declaring them as "acoustically matching" copies.

The description provided herein regards to an acoustic fingerprint of an audio signal (e.g. music track) as a stream (collection) of individual sub-fingerprints (hash-words) characterizing the audio fragment at its different particular locations. The disclosure uses the following terminology and describes the following processes:

- feature-extraction—a process of transforming acoustic content of an audio signal into its quantitative representation based on a selected signal property;
- feature-vector extraction—a process of construction of robust granular set (vector) of the extracted feature values;
- acoustic sub-fingerprint extraction—a process of obtaining short digital data identifier (binary hash-words) out of the feature-vector, which would be well representative for the acoustic signal at a specific granular time-point and would be robust to sound transformations;
- fingerprint extraction—a process of combining numerous acoustic sub-fingerprints of an audio recording into a set providing compact representation of the source acoustic information and allowing to perform its matching with other fingerprints.

The present disclosure proposes a novel approach to audio spectrum hashing for the purpose of acoustic sub-fingerprint extraction, a new method of fingerprint extraction, and a related technique of acoustic matching of audio recordings.

The invention's methods of acoustic sub-fingerprint extraction deals with long-term spectrogram indexing and implements a novel hashing technique, which demonstrates resistance to time stretching and playback speed modification, and has a number of additional important properties. The disclosure also teaches a related method for quantitative estimation of acoustic similarity of two audio fragments, which utilizes key properties of the invention's fingerprint extraction approach. The invention's fingerprinting technique and system extracts highly discriminative sub-fingerprints (hash-words) and fingerprints, allowing the invention to perform fingerprints matching with a very high accuracy. Unlike other existing methods, the invention's system does not imply carrying any kind of temporal information in the fingerprints and not even preserve sub-fingerprints succession, resulting in very compact "timeless" fingerprints and high processing speeds.

In some embodiments, the invention teaches a method for acoustic sub-fingerprint extraction. Here an audio signal is sampled and is segmented into substantially large (e.g. 0.5-1 seconds long) and significantly overlapping frames. The audio signal of each frame is then decomposed into several frequency bands, which significantly (more than 50%) overlap with each other. Signal data in the frequency bands is then quantitatively characterized based on a selected perceptually essential property of the band signal (such as average energy, peak energy, etc.). In order to form a single long-term feature-vector and its corresponding sub-fingerprint, several disjoint, substantially distant, strictly non-overlapping signal frames are selected and are called together a "cluster" of frames.

The long-term audio feature-vector and its corresponding sub-fingerprint are then extracted from the calculated signal property values of the band signals of the cluster frames. More specifically, in an embodiment of the invention's method for sub-fingerprint extraction, a difference (delta) of average energies in pairs of non-adjacent bands of a frame can be used as the acoustic feature. Its first derivative over time, i.e. quantitative change of the said delta from one frame of the cluster to another (non-adjacent) frame of the cluster, is quantized to produce the sub-fingerprint bit-data. It should be especially noted that unlike the prior art methods, in which the differential coding is performed on adjacent bands and frames, according to the invention's methods the differences are calculated over strictly disjoint bands and disjoint frames.

A single sub-fingerprint data should optimally be long enough, typically 2 to 4 bytes long, depending on application. In a preferred embodiment, the extracted sub-fingerprints are 24 bit (3 bytes) long, which allows for $2^{24}$=16.7 millions of different sub-fingerprint values. For this purpose, the number of frames in single cluster and number of frequency bands in single frame should be selected correspondingly.

Unlike prior art fingerprinting methods, at least some embodiments of the present invention can extract long-term sub-fingerprint from a combination of several disjoint, substantially distant, strictly non-overlapping, and at the same time substantially large signal frames. This approach has several significant advantages over other existing sub-fingerprint extraction methods. Namely, the substantially large frame size used for the audio partitioning leads to significant averaging (smoothing) of band signals and results in extraction of very robust sub-fingerprints, which demonstrate high resistance to various aggressive sound transformations as well as to playback speed variation. The use of significantly overlapping frequency bands contributes to resistance to playback speed variation and time scale modification. Additionally, due to the use of non-overlapping and largely spaced frames in the clusters producing sub-fingerprints, the extracted sub-fingerprints represent highly distinctive acoustic data entities carrying high-entropy digital data.

Finally, the derivative of band energy deltas over the time dimension, which some embodiments of the invention use to produce the feature-vectors and their corresponding sub-fingerprint bit-data, represents a highly robust acoustic feature and thus significantly contributes to the overall robustness of the produced sub-fingerprints.

The high degree of discrimination, robustness and high entropy of the extracted acoustic sub-fingerprints are the three key factors making the invention's sub-fingerprint extraction method an efficient tool for acoustic matching of audio recordings.

The invention's fingerprint extraction method comprises in combining all or part of sub-fingerprints extracted from an audio fragment into one set in arbitrary order and without accompanying information. More specifically, the sub-fingerprints are combined into one block of data (while maintaining the sub-fingerprint data alignment according to the sub-fingerprint size) to allow quick and easy addressing. No additional auxiliary information, such as temporal information or information about the order of the sub-fingerprints, is added to the extracted fingerprint data block. The sub-fingerprints may appear in the fingerprint in an arbitrary (even random) order, not necessarily corresponding to their original order in the source audio fragment. To emphasize the fact that the invention's fingerprints do not need to carry time information, these fingerprints are often referred to as "timeless fingerprints".

The audio fragment producing single timeless fingerprint should be long enough to provide meaningful, recognizable acoustic information to a human listener (typically 3-15 seconds long).

One benefit of the invention's approach of omitting any kind of temporal information in the timeless fingerprint is that the invention's methods allows for extracting very compact fingerprints. The invention's approach can significantly reduce fingerprint database size, and also save bandwidth during fingerprint data transfer over communication channels. The invention's approach also accelerates and simplifies search and matching of the extracted fingerprints.

Furthermore, the use of multi-byte high-entropy acoustic sub-fingerprints dramatically reduces probability of collisions resulting in very low error-rate fingerprints matching.

An additional important property of the invention's timeless fingerprint extraction method comprises in its high scalability. Namely, the same set of sub-fingerprints extracted from an audio fragment can be used to create timeless fingerprints of different scale—containing either all of the extracted sub-fingerprints or only a part of them. In particular, in a preferred embodiment, the set of extracted sub-fingerprints is first refined to remove any repetitive or "unreliable" sub-fingerprints. Different "versions" of fingerprints (such as more detailed and more compact, intersecting and disjoint fingerprints) can be created from the same set of sub-fingerprints.

Determining acoustic similarity of two audio fragments is performed by matching their corresponding timeless fingerprints. The matching is mostly done by calculating the number of identical (bit-exact) sub-fingerprints contained in the fingerprints (number of "hits"). The resulting number of hits has only to be normalized and thresholded to produce the numerical value of the acoustic similarity. No additional special logic, bit-error rate (BER) calculation or distance measurement (such as Euclidean, Manhattan or Hamming distance) is involved in the matching process.

Matching of long audio recordings is done by matching their corresponding timeless "super-fingerprints". A long audio recording (e.g. music track) is segmented into shorter fragments (e.g. 10 seconds long), timeless fingerprint is extracted from each fragment, and the extracted fingerprints are combined together into one set to produce the timeless super-fingerprint of the long audio recording. Similar to the timeless fingerprints, the timeless super-fingerprints are constructed by combining the timeless fingerprints in arbitrary order and without adding any auxiliary direct or indirect temporal information. Matching of two timeless super-fingerprints, corresponding to two long audio recordings, is performed by matching pairs of fingerprints they contain and by combining the matching results together into a set of matching results. Different methods can be applied to compute a single numerical value of acoustic similarity out of the set of the matching results. Examples of such methods are disclosed in details hereinafter.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Thus in some embodiments, the invention may be, or at least rely upon, an automated method for extracting an acoustic sub-fingerprint from an audio signal fragment. This embodiment of the invention's methods can typically be implemented by at least one computer processor. This computer processor can be a standard computer processor, such as a microprocessor/microcontroller using various processor cores such as x86, MIPS, ARM, or other type processor cores, or it may be a custom circuit such as a FPGA, ASIC, or other custom integrated circuit. This at least one computer processor will perform various operations, such as the following:

a: using at least one computer processor to divide an audio signal into a plurality of time-separated signal frames (frames) of equal time lengths of at least 0.5 seconds, wherein all frames overlap in time by at least 50% with at least one other frame, but wherein at least some frames are non-overlapping in time with other frames.

b: using at least one computer processor to select a plurality of non-overlapping frames to produce at least one cluster of frames, each selected frame in a given cluster of frames thus being a cluster frame; wherein the minimal distance between centers of these cluster frames is equal or greater than a time-length of one frame.

c: using at least one computer processor to decompose each cluster frame into a plurality of substantially overlapping frequency bands to produce a corresponding plurality of frequency band signals, wherein these frequency bands overlap in frequency by at least 50% with at least one other frequency band, and wherein at least some frequency bands are non-adjacent frequency bands that do not overlap in frequency with other frequency bands.

d: for each cluster frame, using at least one computer processor to calculate a quantitative value of a selected signal property of frequency band signals of selected frequency bands of that cluster frame, thus producing a plurality of calculated signal property values, this selected signal property being any of: average energy, peak energy, energy valley, zero crossing, and normalized energy.

e: using at least one computer processor, and a feature vector algorithm and the calculated signal property values of these cluster frames to produce a feature-vector of the cluster.

f: using at least one computer processor and a sub-fingerprint algorithm to digitize this feature-vector of the cluster and produce the acoustic sub-fingerprint.

DETAILED DESCRIPTION OF THE INVENTION

The present invention, in some embodiments thereof, relates to a method and system of acoustic fingerprinting allowing to determine acoustic similarity of audio recordings. Note that all steps disclosed herein are intended to be automatically implemented by one or more computer processors.

At a pre-processing stage, it is often useful to first convert any digital (sampled) multi-channel audio data to a single (mono) channel and downsample the audio data to a low sampling rate, thus providing sufficient audio bandwidth and acoustic data for the human auditory system to recognize the audio.

In a preferred embodiment, the selected operational sampling rate may be 8000 Hz, which corresponds to a typical telephony audio channel bandwidth.

Acoustic Sub-Fingerprint Extraction

The time-domain signal of an audio fragment is segmented into overlapping frames, and the frame signals are weighted with a suitable window function such as the Hann or Hamming window.

Figure 1:
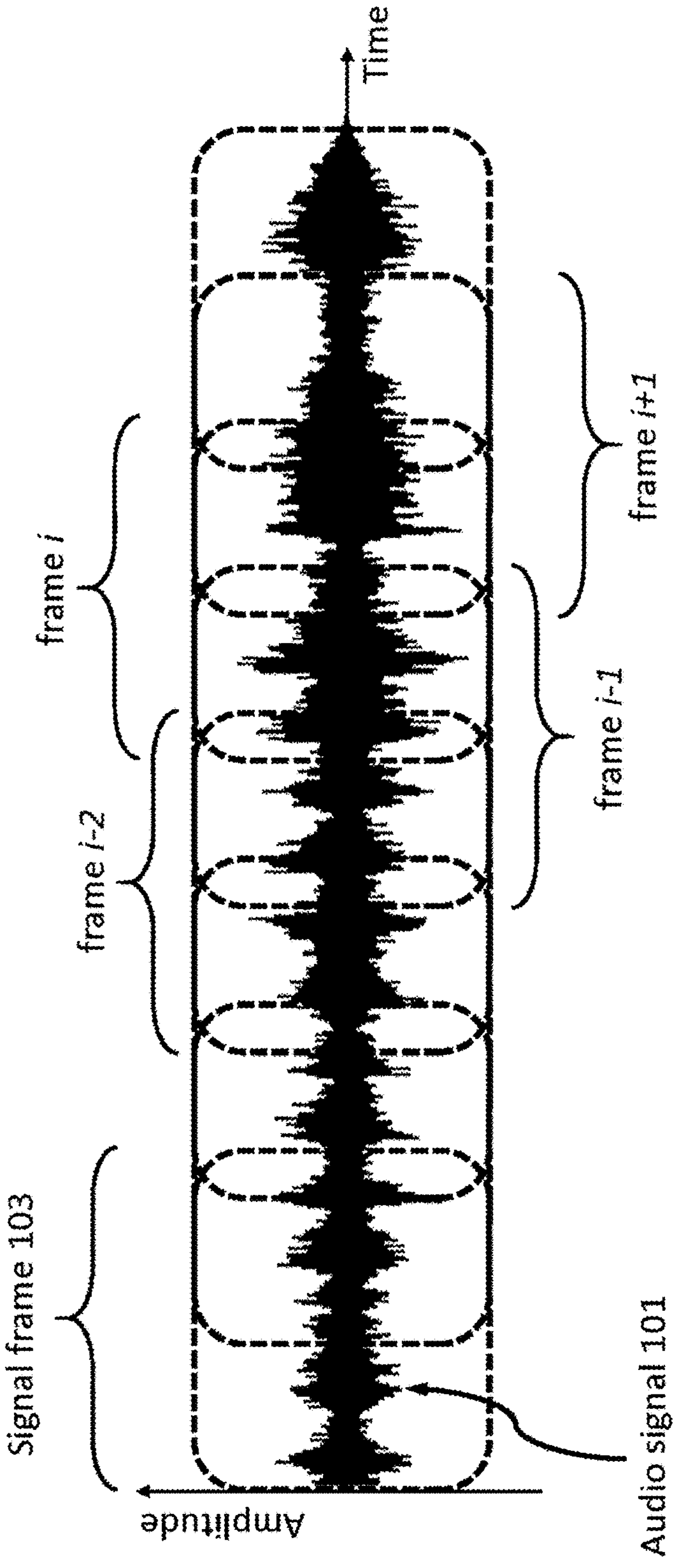
FIG. 1 shows the segmentation of input time-domain audio signal into overlapping frames.
Figure 2:
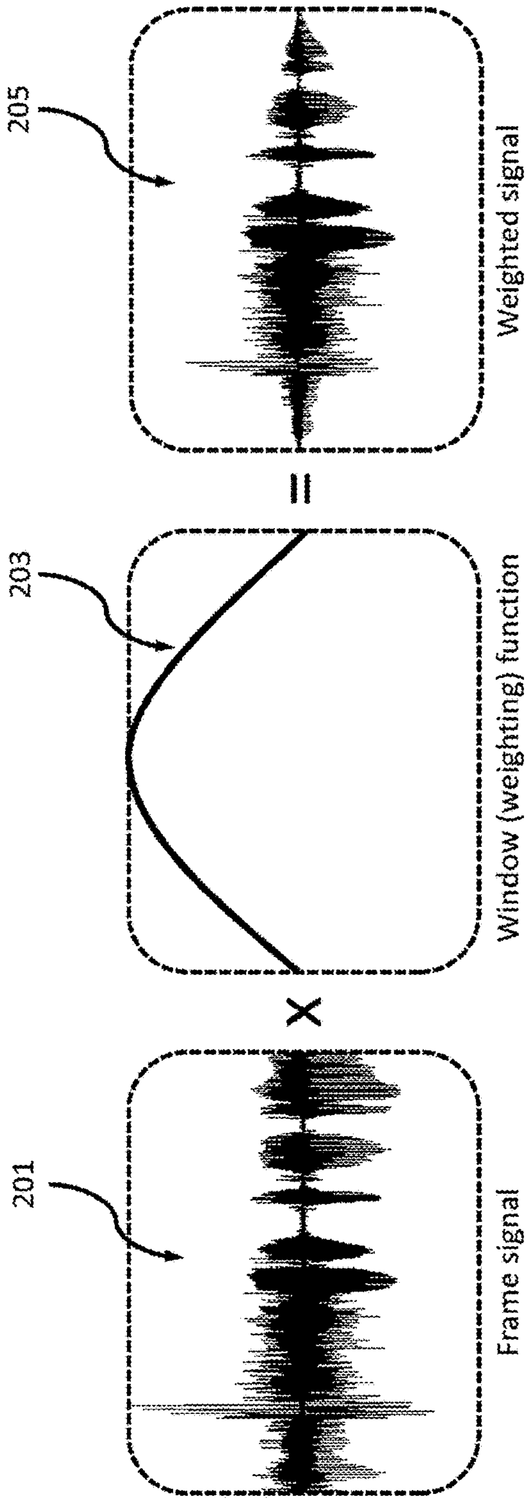
FIG. 2 shows applying a window function to the frame signal.

The segmentation of the audio fragment signal into overlapping frames is depicted in FIG. 1. The time-domain audio signal 101 is shown as a waveform on time-amplitude plot. The audio signal is segmented into signal frames 103 having sequential numbers i−1, i, i+1, . . . and overlapping by more than 50% with each other. Weighting the frame time-domain signal with a window function is depicted in the FIG. 2. Frame signal sample data 201 is multiplied by the window function 203 to produce the weighted signal frame 205.

In a preferred embodiment, the frame size is selected to be large, 4096 samples (which corresponds to approximately 0.5 seconds at 8000 Hz sampling rate), with the aim to provide substantial signal averaging and increased stability to noises. The overlapping factor is selected to be large too. In a preferred embodiment, it is set to 64, which leads to extraction of approximately 125 signal frames per 1 second of audio. Hann window is used as the weighting function.

Figure 3:
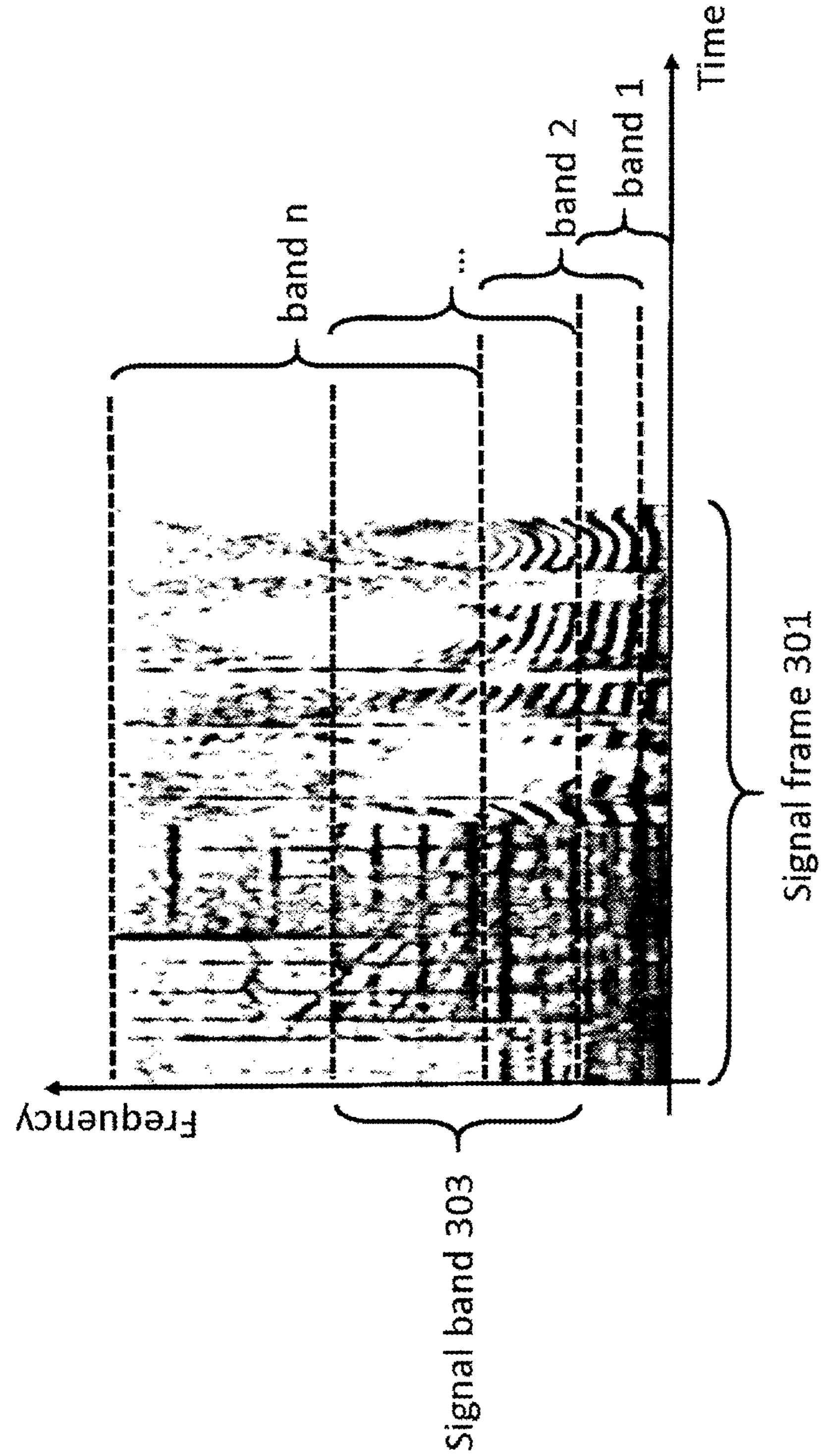
FIG. 3 shows decomposition of the frame signal into semi-logarithmically scaled, substantially overlapping frequency bands.

The time-domain audio signal of each frame is then decomposed into several frequency bands, which significantly overlap with each other. Decomposition of the signal into n semi-logarithmically scaled frequency bands with >50% overlap is illustrated in FIG. 3. The signal frame 301 is decomposed into frequency bands 303 overlapping with each other and having semi-logarithmically scaled bandwidth.

In a preferred embodiment of the algorithm, the frequency bands are constructed so that each next band contains at least half of the bandwidth of the previous band. The decomposition can be performed using different methods such as filter bank, FFT decomposition, etc.

The bands can be scaled in linear or logarithmic scale. The logarithmic scale better covers sliding of spectrum details up and down as the result of time/speed modification.

In a preferred embodiment, FFT decomposition is performed on each frame (4096 samples), and the obtained frequency spectrum is divided into 16 significantly overlapping (more than 50%) frequency bands with semi-logarithmic bandwidth scaling (i.e. having bandwidth increasing with frequency).

The invention's frequency bands construction method using large band overlap has significant advantage over the non-overlapping, disjoint bands approach, and demonstrates improved resistance to playback speed variation, which inevitably causes salient spectral features to slip from one frequency to another due to spectrum stretching.

The number of bands in single frame should be selected in consideration of required bit-length of a single sub-fingerprint and other related factors as described hereinafter.

The long-term approach of the invention's method comprises in using a cluster of several disjoint, substantially distant, non-overlapping signal frames to form a single acoustic sub-fingerprint. Namely, for the reference frame having sequential number i in the source audio fragment, in order to form a cluster of frames, one or more additional preceding disjoint signal frames are selected, such as frames with numbers i−n, i−2n, . . . , where n is large enough to provide at least one frame size separation between two frames in the cluster. The selected frames should not overlap with each other in order to contribute independent, uncorrelated information into their combination in the cluster.

In a preferred embodiment, each cluster is formed by three frames. Two, four or more frames can be used in other possible implementations, including, depending on the required bit-length of a single sub-fingerprint, selected number of bands in one frame and other related factors.

In a preferred embodiment, the distance between centers of two closest frames in the cluster is set to be twice the frame size.

Figure 4:
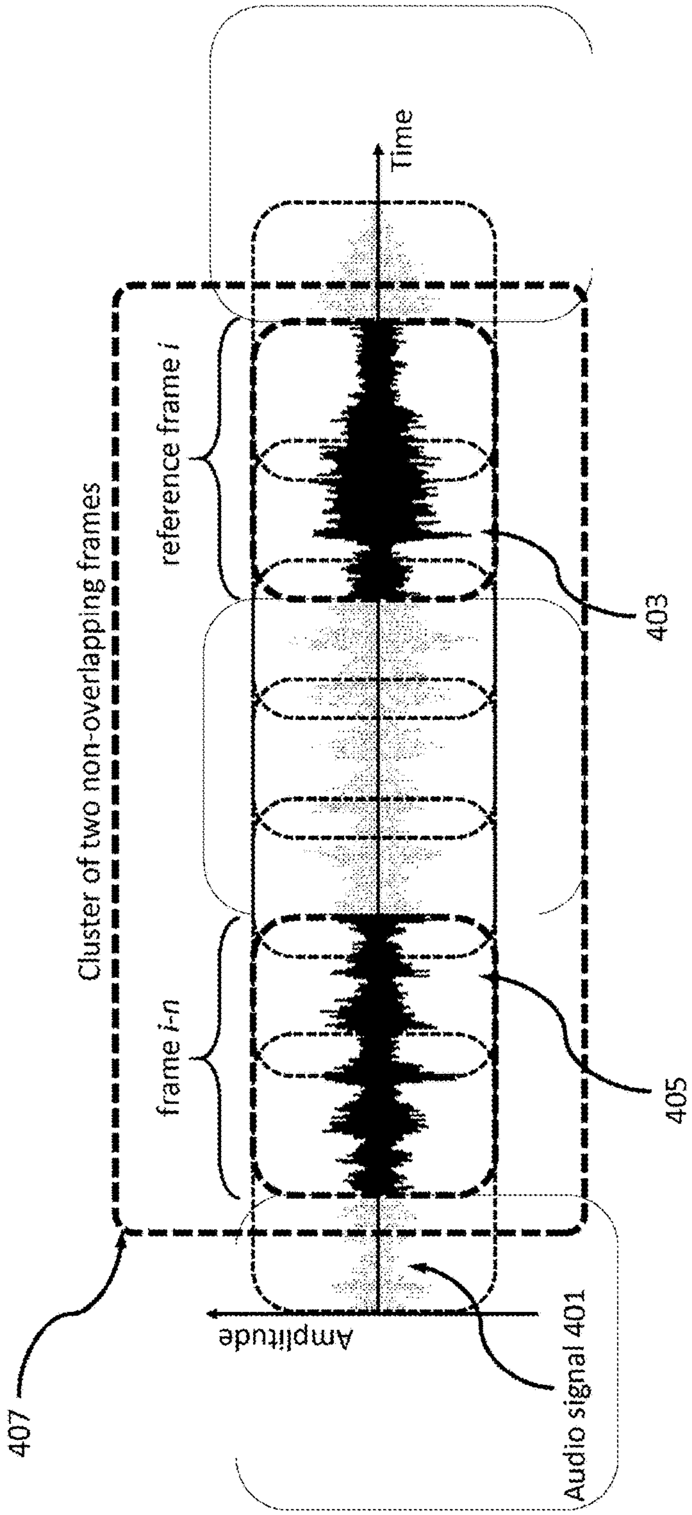
FIG. 4 shows a cluster of frames consisting of two non-overlapping, non-adjacent signal frames.

FIG. 4 illustrates two non-overlapping, time-separated signal frames of an audio signal 401, namely, the reference frame 403 having number i and its preceding frame 405 having number i−n, forming a single cluster 407.

A single cluster of frames is used to produce a single sub-fingerprint. In a preferred embodiment, each consecutive cluster of frames, corresponding to each consecutive reference frame, is used to extract a corresponding sub-fingerprint. In other embodiments, clusters that are used for sub-fingerprint extraction can be selected based on a specific criterion (e.g. frame signal level thresholding) or even randomly. An exact mechanism and criteria on selecting clusters suitable or not suitable for sub-fingerprint extraction is located outside the scope of this description. Fingerprint matching and searching approaches disclosed hereinafter do not rely on either succession or on contiguousness of the sub-fingerprints in the fingerprint.

In order to form a single sub-fingerprint, the spectral band data contained in frames of the cluster is first quantitatively characterized. The characterization is done based on a selected perceptually essential property of the band signal (e.g. average band energy). A feature-vector is then constructed by applying a specific calculation method to the numerical values of the spectral band data property and combining the calculated values into one set. The constructed feature-vector is then converted into a sub-fingerprint binary data using a pre-defined computation rule.

Various different signal properties can be used to generate (extract) the feature-vector and the corresponding sub-fingerprint data from the data carried by the band signals of frames in the cluster. Examples of possible signal properties that can be used for this purpose: zero-crossing, peak energy, average energy, etc. In the simplest implementation, the feature-vector can be produced by combining the calculated band signal property values into one vector, and the sub-fingerprint can be then derived from this simple feature-vector by rounding its values to one of two closest pre-defined levels to obtain the corresponding 0's or 1's for the data-bits of the sub-fingerprint.

The invention is based, in part, on the insight, obtained from experimental work, that the difference (delta) of average energies in non-adjacent bands of a frame represents robust, resistant and highly discriminative signal property. Its derivative over time, i.e. a quantitative rate of change of the said delta from one frame of the cluster to another frame of the cluster (note that the frames are non-overlapping and time-separated), has been selected to be the basis for the feature-vector extraction in a preferred embodiment. The derivative is preserved well under various real-world audio transformations such as EQ, lossy audio codec compression and even transducing over-the-air, and therefore represents a suitable fingerprinting feature.

In a preferred embodiment, the feature-vector of the cluster and its corresponding sub-fingerprint can be computed by performing the following procedure:

a) calculating signal property values (e.g. average energy) $E_k^i$ of band signals in each frame of the cluster (where i denotes the number of frame, k denotes the number of frequency band in the frame);

b) calculating differences (delta) $\delta_{k,l}^i$ of the calculated signal property values $E_k^i$ in selected non-adjacent bands k,l of each frame i:

$$\delta_{k,l}^i = E_k^i - E_l^i, |l-k|>1;$$

c) calculating differences (derivative) $\partial_{k,l}^{i,j}$ of the delta values over two cluster frames i,j (time axis) in corresponding bands k,l:

$$\partial_{k,l}^{i,j} = \delta_{k,l}^i - \delta_{k,l}^j, |i-j|>>1,$$

i,j are non-overlapping, time-separated frames d) combining the calculated derivative values for different combinations of bands k,l and frames i,j within the cluster into one set to produce the feature-vector V representing this cluster:

$$V=\{\partial_{k,l}^{i,j}\};$$

e) computing the sub-fingerprint binary data F by quantizing the calculated values of the feature-vector V (the derivative values).

In another possible embodiment, the derivatives ∂ on the step (c) are calculated on the same frame, but for different pairs of bands: $\partial_{(k,l),(m,n)}{}^{i}=\delta_{k,l}{}^{i}-\delta_{m,n}{}^{i}$, wherein i is a number of frame, and k, l, m, n b are band numbers. Other variations of this method are possible.

Figure 5:
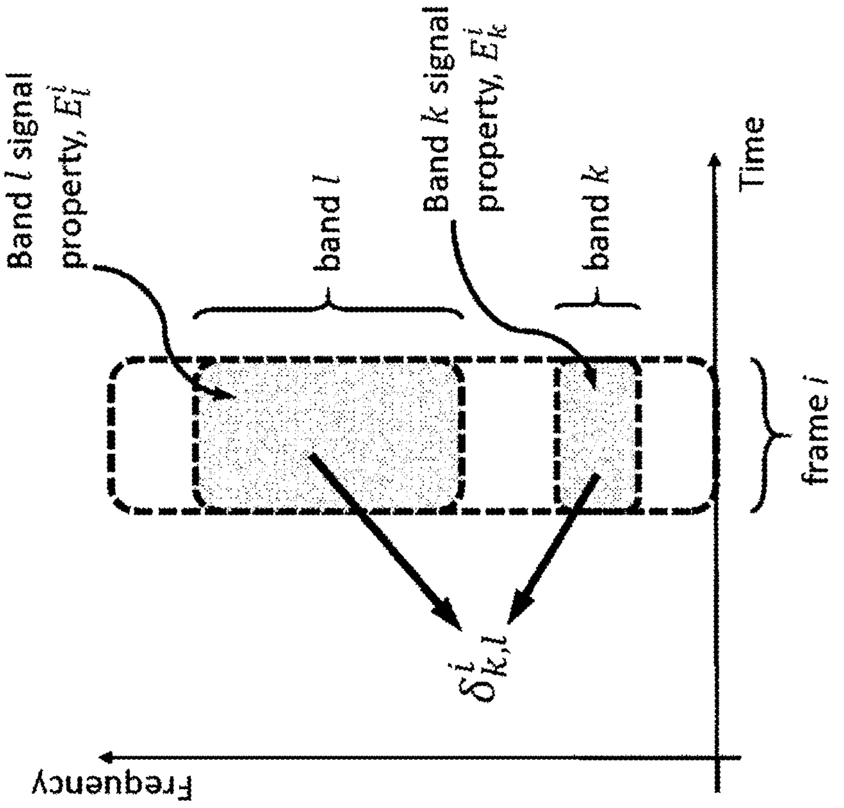
FIG. 5 shows calculating the delta (difference) value of signal property values (e.g. energy) of non-adjacent bands of a single frame.

FIG. 5 depicts the calculation of single energy delta $\delta_{k,l}{}^{i}$ using two values of selected signal property (e.g. band signal energy) of two non-adjacent frequency bands l, k of frame i, namely:

$$\delta_{k,l}{}^{i}=E_{k}{}^{i}-E_{l}{}^{i}.$$

Figure 6:
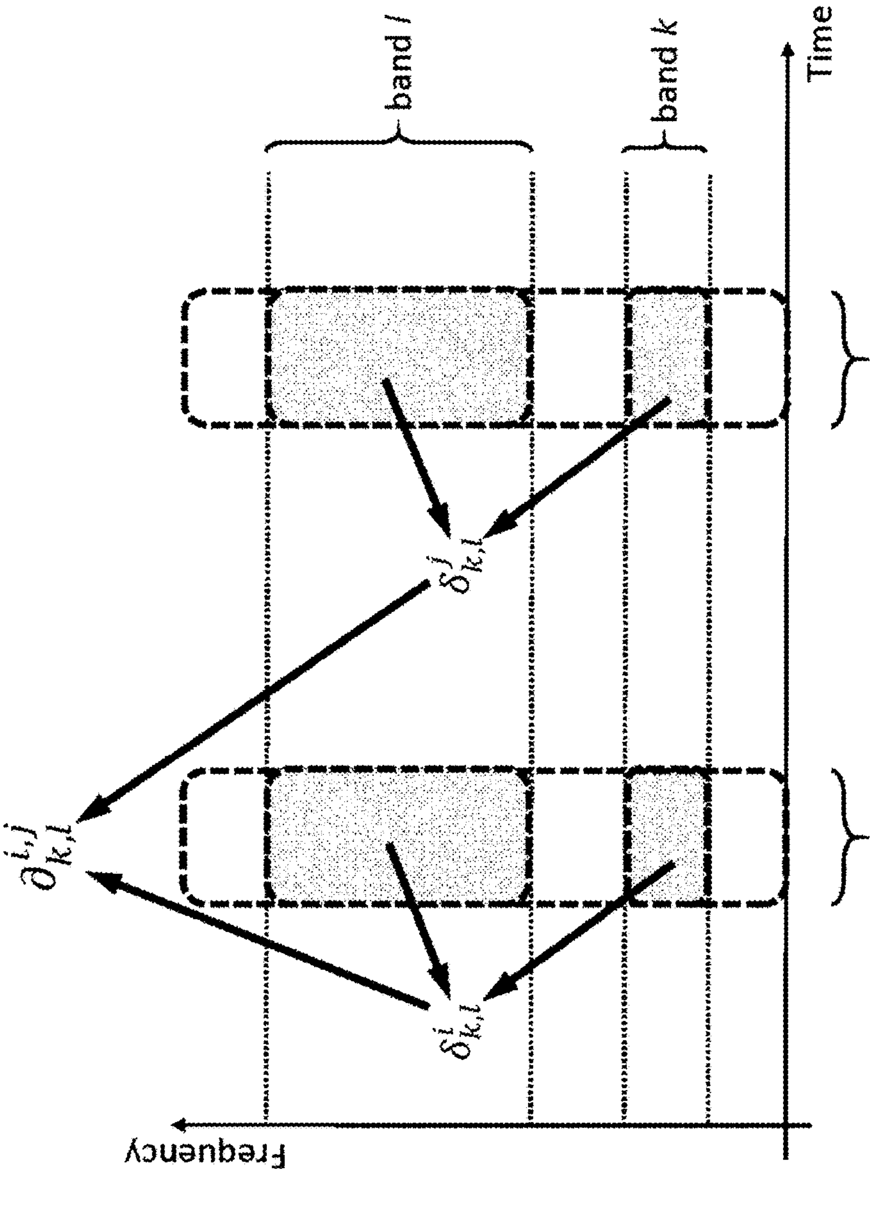
FIG. 6 shows calculating the derivative (difference) value from two delta values of two non-adjacent frames i,j comprising a single cluster.

FIG. 6 depicts calculation of derivative (difference) $\partial_{k,l}{}^{i,j}$ of two deltas $\delta_{k,l}{}^{i}$, $\delta_{k,l}{}^{j}$ in two non-adjacent frames i,j comprising a single cluster.

In some embodiments of the invention, the feature vector algorithm and the at least one computer processor can perform the steps of over at least two of the cluster frames, within individual cluster frames, selecting pairs of non-adjacent frequency bands, and calculating a difference between said calculated signal property values of the pairs of non-adjacent frequency bands. This lets the algorithm obtain within-frame non-adjacent band signal property delta values. Then within the individual cluster frames, the algorithm combines these within-frame non-adjacent band signal property delta values to produce an individual frame delta set for that individual cluster frame. The algorithm then selects pairs of these cluster frames (each cluster frame having a position within the cluster), and uses this position within the cluster to calculate derivatives of corresponding pairs of these individual frame delta sets. This process lets the algorithm produce the between-frame delta derivative values. The algorithm can then produce the feature-vector of the cluster by combining these between-frame delta derivative values.

More specifically, in a preferred embodiment, when the selected signal property is the average energy, the energy deltas $\delta_{k,l}{}^{i}$ are calculated in each of the three non-adjacent frames $i=i_1, i_2, i_3$, comprising the cluster, as a difference of average energies $E_k{}^{i}$ in non-adjacent bands with indexes $(k,l)\in\{(1,5), (2,6), \ldots, (12,16)\}$. As a result, 12 energy deltas $\delta_{k,l}{}^{i}$ are extracted from each frame $i=i_1, i_2, i_3$ of the cluster. Derivatives of the deltas are then calculated as a difference of the deltas in adjacent cluster frames, i.e.

$$\partial_{k,l}{}^{i1,i2}=\delta_{k,l}{}^{i1}-\delta_{k,l}{}^{i2},$$

$$\partial_{k,l}{}^{i2,i3}=\delta_{k,l}{}^{i2}-\delta_{k,l}{}^{i3}.$$

As a result, 24 derivative values are obtained, and the feature-vector V is constructed:

$$V=\{\partial_{1,5}{}^{i1,i2},\partial_{2,6}{}^{i1,i2}, \ldots ,\partial_{12,16}{}^{i1,i2},\partial_{1,5}{}^{i2,i3},\partial_{2,6}{}^{i2,i3}, \ldots ,\partial_{12,16}{}^{i2,i3}\}.$$

Digitization: The feature-vector of the cluster will often initially comprise a vector comprising positive and negative feature-vector numeric values. To further simplify this, the sub-fingerprint algorithm can digitize this cluster feature-vector to a simplified vector of binary numbers. The algorithm can do this by, for example, setting positive feature vector numeric values to 1, and other feature vector numeric values to 0. This produces a digitized acoustic sub-fingerprint.

More specifically, in a preferred embodiment, the acoustic sub-fingerprint F data bits can be extracted by quantizing the sign of the feature-vector V values (i.e. quantizing the derivatives): F=sign(V). Namely, the bit value is set to 1 if the corresponding derivative $\partial_{k,l}{}^{i,j}$ is positive, and 0 otherwise. As a result, the extracted feature vector F consists of 24 bits (3 bytes).

Other feature vector construction methods: In some embodiments, the feature vector algorithm can also perform the steps of selecting, within individual cluster frames, pairs of non-adjacent frequency bands. This algorithm can then obtain within-frame non-adjacent band signal property delta values by calculating differences between the signal property values of these pairs. Additionally, the algorithm can also combine, within individual cluster frames, a plurality of these within-frame non-adjacent band signal property delta values to produce an individual frame delta set. The feature vector algorithm can then produce the feature vector by combining, over these cluster frames, the frame delta sets from these individual cluster frames.

More specifically, in some embodiments, each cluster is formed by two frames, and the feature-vector V is constructed directly from the values of the in-frame deltas: $V=\{\delta_{k,l}{}^{i}\}$, where $i=i_1, i_2$ and $(k,l)\in\{(1,5), (2,6), \ldots, (12,16)\}$. This method also yields a feature-vector having 24 values. The sub-fingerprint F is extracted by quantizing the sign of the feature-vector V values: F=sign(V). As a result, the extracted feature vector F consists of 24 bits (3 bytes).

Figure 7:
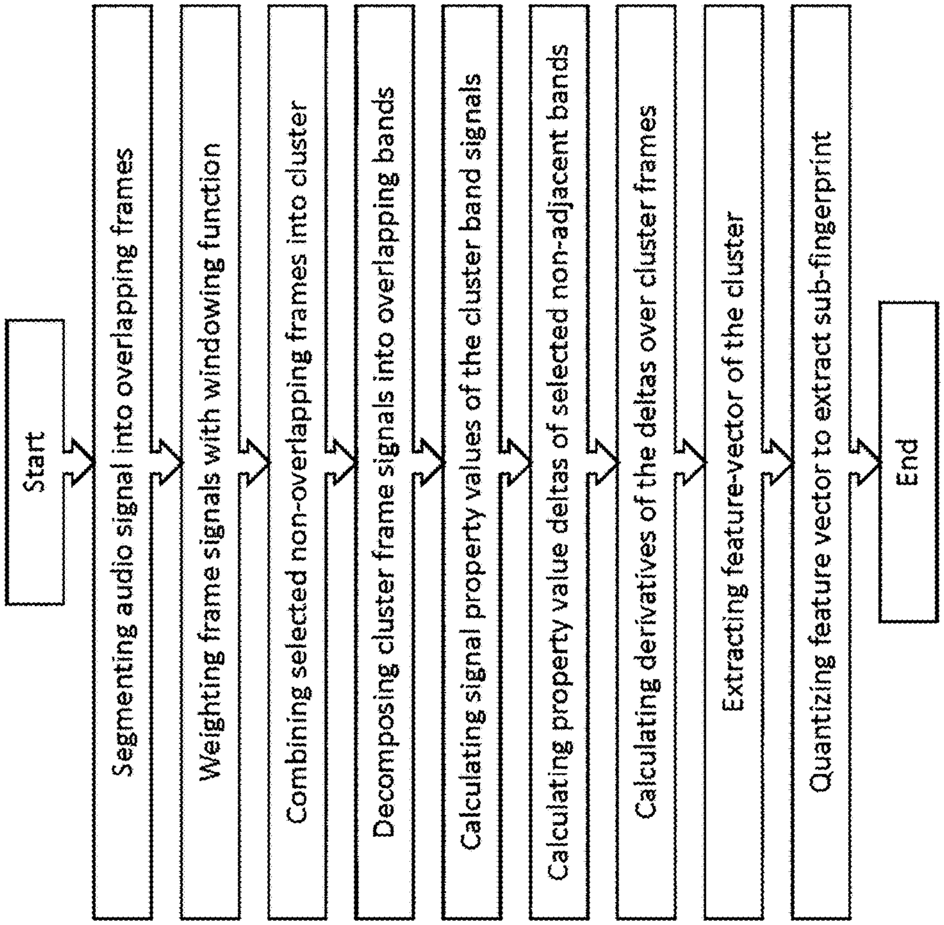
FIG. 7 shows a simplified flowchart of the sub-fingerprint extraction procedure.

A summary of the invention's sub-fingerprint extraction process is depicted in FIG. 7 by means of a simplified flowchart. The flowchart summarizes the steps of the procedure for extracting sub-fingerprint from an audio signal fragment.

The invention's long-term acoustic sub-fingerprint extraction method results in extraction of very robust sub-fingerprints that remain invariant under aggressive transformations of sound. In particular, due to substantially large frame size used for the audio partitioning, most of the sub-fingerprints remain intact even under significant (several percent) playback speed variation and time scale modification.

Additionally, the use of non-overlapping and largely spaced frames in the clusters producing sub-fingerprints, combined with the nature of the selected signal property and the large number of bits in the produced sub-fingerprint, results in extraction of highly representative and highly discriminative sub-fingerprints.

Timeless Fingerprint Extraction

In prior art systems, fingerprint of an audio fragment is usually generated by combining its sub-fingerprints into one set together with a corresponding additional data such as explicit or implicit information about time-location of the sub-fingerprints in the source audio fragment. In particular, some fingerprint extraction techniques are based on coupling the sub-fingerprint data with its corresponding time-position (time-stamp) in the source signal. Other methods imply combining sub-fingerprints exactly in the order of their arrival, i.e. in the same order as their corresponding reference frames appear in the source signal. These methods are usually imposed by the need to compensate for imperfect degree of discrimination of the sub-fingerprints using the added extra information (such as the absolute or at least relative sub-fingerprint time-location) in order to reduce error rate of fingerprint matching and search. The added information inevitably increases the size of the fingerprint data.

The "timeless" fingerprinting method disclosed herein removes the necessity to use any extra information about sub-fingerprint time-locations. Due to the specifics and the special properties of the invention's acoustic sub-fingerprint extraction method, the extracted acoustic sub-fingerprints represent highly discriminative data entities. A sub-fingerprint produced by the invention's method represents a highly distinguishing, unambiguous quantitative characteristic of the source acoustic signal not only at the specific time-location but also, with a large degree of confidence, over a long signal range around the source time-location from which it has been extracted. For real-world audio recordings, such as speech or music having dynamic acoustic content, the sub-fingerprints derived from it by the described method have almost no repetitive values in non-adjacent positions over very long fragments of audio. Thus, combining together several highly discriminative sub-fingerprints originating from an audio fragment into one set results in high-entropy data and therefore, with a very large degree of confidence, ensures that no other acoustically different audio fragment can produce a fingerprint containing the same sub-fingerprints. This insight is an important aspect of the invention's fingerprint extraction method.

Thus, the invention's timeless fingerprint extraction method comprises in combining the highly discriminative sub-fingerprints extracted from an audio fragment into one set without adding any additional auxiliary information such as the sub-fingerprint absolute or relative temporal data. The use of multi-byte high-entropy sub-fingerprints dramatically reduces probability of collisions, i.e. probability to encounter another acoustically different fragment, which would result in extraction of the same sub-fingerprints. At the same time, omission of any auxiliary information saves significant amount of space on storing the fingerprint data, allows producing compact fingerprints, and squeezes fingerprint database size very significantly.

Moreover, since no relative or absolute temporal data is stored in the fingerprint, the order of the sub-fingerprints in the timeless fingerprint becomes meaningless too. This allows to speed-up the fingerprint extraction significantly by parallelizing the sub-fingerprints extraction process in capable computational systems and storing the extracted sub-fingerprints in the order as they arrive from the extractor without the need to preserve their original sequential order relative to the source audio stream.

Importantly, the same set of sub-fingerprints extracted from an audio fragment can be used to create timeless fingerprints of different "scale"—containing all of the extracted sub-fingerprints or only a part of them. Different "versions" of timeless fingerprints (such as more detailed and more compact, intersecting and disjoint) can be created from the same set of sub-fingerprints.

Thus in some embodiments, the invention can be used in an automated method for extracting a timeless fingerprint that characterizes at least a fragment of an audio signal. This embodiment of the invention can, for example comprise:

a: using at least one computer processor to divide any of an audio signal, or a fragment of said audio signal with a time length greater than 3 seconds, into a plurality of time-overlapping signal frames (frames).

b: using at least one computer processor to create a plurality of frame clusters, each frame cluster (cluster of frames) comprising at least two non-overlapping frames; wherein each frame cluster comprises frames (cluster frames) that are disjoint, non-adjacent, and substantially spaced from other frame cluster frames.

c: using at least one computer processor to select these frame clusters, and use the previously discussed acoustic sub-fingerprint methods to compute sub-fingerprints for at least some of these selected frame clusters, thus producing a set of sub-fingerprints, wherein each selected frame cluster produces a single sub-fingerprint.

d: using at least one computer processor to remove those sub-fingerprints that have repetitive values from this set of sub-fingerprints, thus producing a refined set of sub-fingerprints for this plurality of frame clusters.

e: producing one or more timeless fingerprints by combining, in an arbitrary order, and without any additional information, at least some selected sub-fingerprints from this refined sub-fingerprint set.

These above fingerprints are considered "timeless" because the sub-fingerprints do not carry information about a time location or position of the selected frame clusters relative to the audio signal or fragment of the audio signal. Further, these sub-fingerprints also do not carry information about a time location or position of these selected frame clusters relative to a time location or position of other clusters of frames used to generate other sub-fingerprints comprising this timeless fingerprint.

Note also that in some embodiments at least some selected sub-fingerprints from the refined sub-fingerprint are combined in an arbitrary manner which is independent from an order in which the corresponding frame clusters of these audio signals appear in the audio signal or fragment of an audio signal.

Eventually, the invention's timeless fingerprint extraction method comprises in combining acoustic sub-fingerprints $F_1, F_2, \ldots, F_n$ extracted from the audio fragment into one set $\Phi=\{F_i\}$, i=1 . . . n, in arbitrary (in particular, even random) order, and without any additional information (such as any absolute or relative temporal information). For example: $\Phi=\{F_5, F_1, \ldots F_{n-3}, \ldots, F_3\}$ Any repetitive sub-fingerprints can be omitted to produce compact fingerprint. It is also possible to apply additional filtering of the sub-fingerprints set in order to further reduce its size. Finally, the same set of sub-fingerprints can be used to produce various different, intersecting or non-intersecting sub-fingerprint sub-sets and their corresponding fingerprints.

In a preferred embodiment of the invention's fingerprint extraction method, the set of sub-fingerprints extracted from the audio fragment is refined by removing any consecutive sub-fingerprints having repetitive values. Additionally, any "unreliable" sub-fingerprints (e.g. sub-fingerprints extracted from signal frames containing energy deltas with low values) are removed from the set. The sub-fingerprints from the refined set are combined together into one block of data to produce the acoustic fingerprint of the audio fragment. Appropriate sub-fingerprint data alignment is maintained within the fingerprint data block. Such implementation results in extraction of fingerprints encountering approximately 30 sub-fingerprints per second of audio in average. With the 24-bit (3 bytes) long sub-fingerprints, this results in extraction of approximately 90 bytes of acoustic fingerprint data per second of audio. Thus, the ratio of the size of the extracted acoustic characterization information (with the data rate of 90 bytes per second) to the size of the source raw audio information (with the data rate of 16 Kbytes per second for 8000 Hz/16 bit PCM audio) is around 0.0056, which corresponds to data reduction by a factor of 177.

Figure 8:
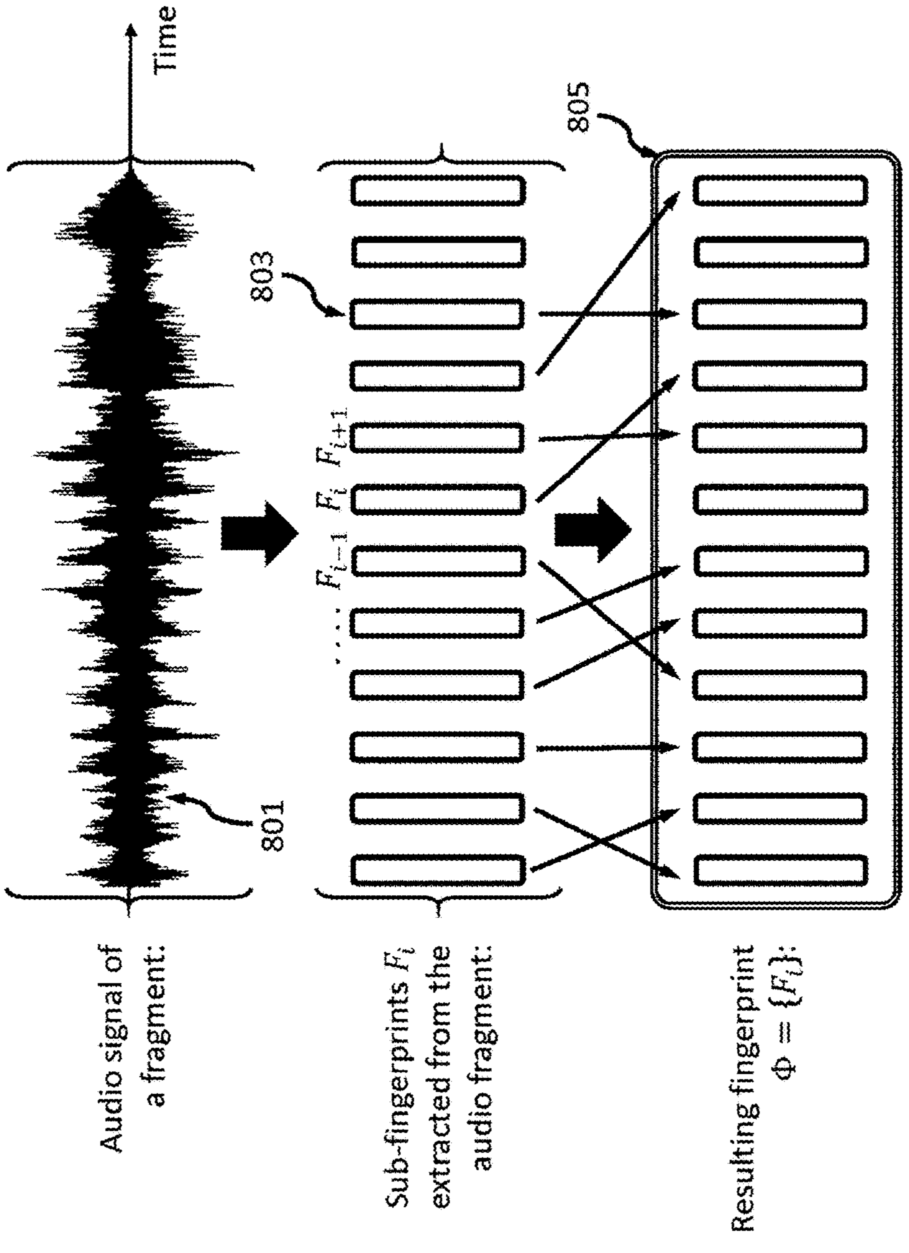
FIG. 8 shows a fingerprint of a fragment combined of sub-fingerprints in arbitrary order.

Combining the acoustic sub-fingerprints of an audio fragment in an arbitrary order into one timeless fingerprint is depicted in FIG. 8. Sub-fingerprints 803 are extracted from an audio fragment 801 and are then combined into one fingerprint block 805 in an arbitrary order (original sequential order is not preserved, and some fingerprints are omitted).

In a preferred embodiment, the size of audio fragment producing a single fingerprint has been selected to be 10-20 seconds long.

A timeless fingerprint matching technique described hereinafter makes no use of the order, temporal, or any other additional information about the sub-fingerprints comprising the fingerprint.

Determining Acoustic Similarity by Matching of Timeless Fingerprints

High-entropy fingerprint data combined with high degree of discrimination and robustness of sub-fingerprints comprising the fingerprint, allows performing reliable, low-error matching of two fingerprints without requiring any extra information such as information about temporal location of the sub-fingerprints in the source audio fragment and/or relative to each other.

In order to perform reliable matching of two even substantially long audio fragments and to judge about their acoustic similarity with rather high confidence, it is enough to apply the most straight-forward approach and simply calculate the number of identical sub-fingerprints ("hits") contained in the corresponding timeless fingerprints of the two audio fragments. The resulting number of hits has to be only normalized and thresholded with an experimentally adjusted threshold to declare the two fingerprints a "match" or a "miss". No additional special logic or bit-error rate (BER) calculation or distance measuring (such as Euclidean, Manhattan or Hamming distance) is involved in the process. This approach allows performing efficient search even in a large database, provided that the database consists of fingerprints having sizes comparable to the size of the matched fingerprint.

More specifically, in a preferred embodiment, matching of two audio fragments $A^1$ and $A^2$ with their corresponding timeless fingerprints $\Phi^1=\{F_i^1\}$ and $\Phi^2=\{F_j^2\}$ is performed by finding a set $C^{1,2}$ consisting of acoustic sub-fingerprints F contained in the both fingerprints: $C^{1,2}=\{F|F\in\Phi^1\cap\Phi^2\}$. The size of the set $C^{1,2}$ is the number of "hits", $h^{1,2}=|C^{1,2}|$ (where the operator $|\cdot|$ denotes number of members). The degree of acoustic similarity d of $A^1$ and $A^2$ is then computed as:

$$d = \frac{h^{1,2}}{\min(|\Phi^1|, |\Phi^2|)}$$

The resulting degree of acoustic similarity d is a value between 0.0 and 1.0. For example, if fragment $A^1$ is a sub-fragment of $A^2$ then $\Phi^1\subseteq\Phi^2$ and therefore $C^{1,2}=\Phi^1$, $h^{1,2}=|C^{1,2}|=|\Phi^1|$ which leads to d=1.0. To the contrary, if fragments $A^1$ and $A^2$ are totally different acoustically, then $\Phi^1\cap=\Phi^2\emptyset$, $C^{1,2}=\emptyset$, $h^{1,2}=\emptyset$, and therefore d=0.0.

Figure 9:
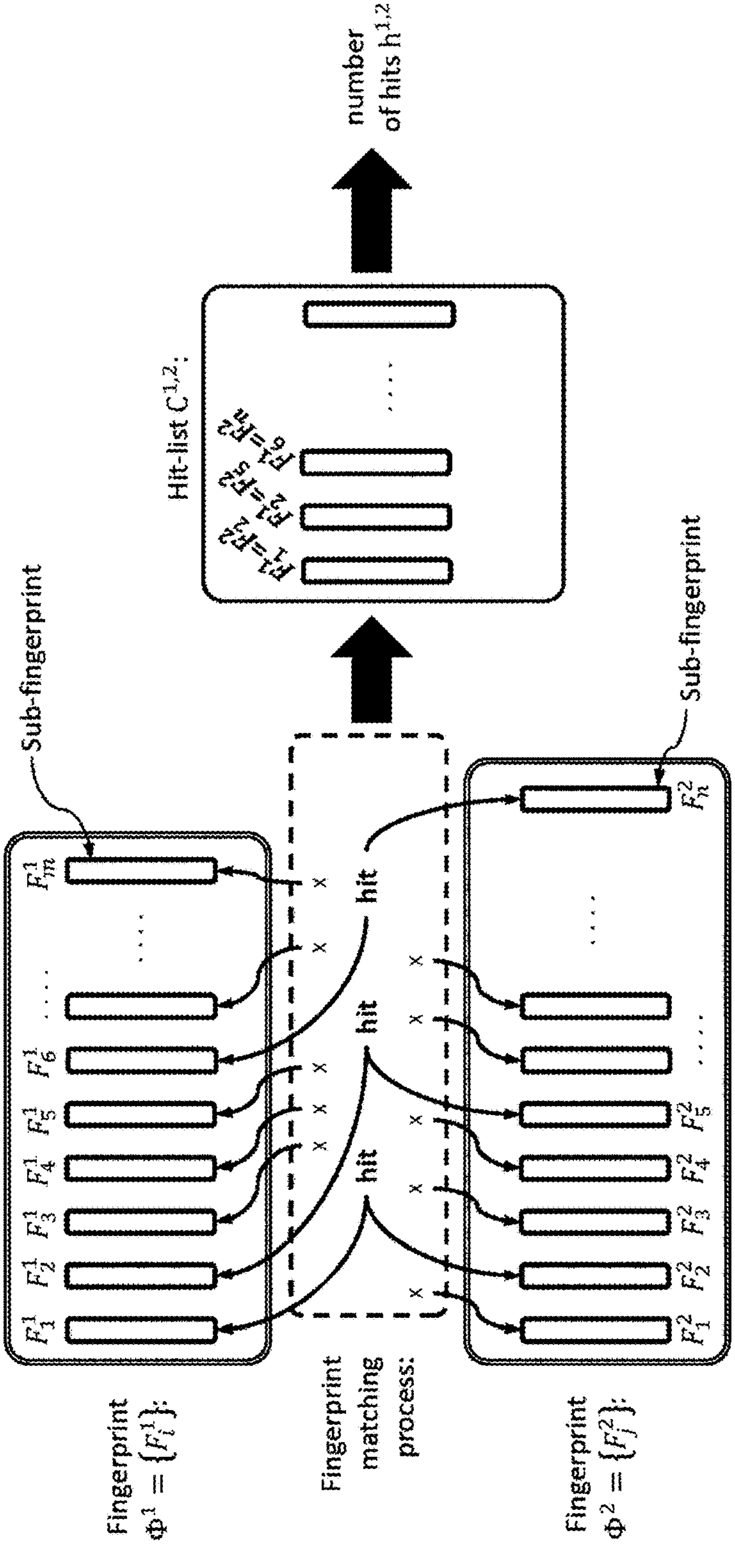
FIG. 9 shows matching of two fingerprints.

The matching process described hereinbefore is depicted in FIG. 9. Two timeless fingerprints $\Phi^1=\{F_i^1\}$ and $\Phi^2=\{F_j^2\}$ are analyzed, each containing its corresponding acoustic sub-fingerprints. Identical sub-fingerprints (hits) contained in the both fingerprints are identified and are stored in the hit-list $C^{1,2}$. The number of sub-fingerprints contained in the hit-list $C^{1,2}$ gives the number of hits $h^{1,2}$: $|C^{1,2}|=h^{1,2}$.

When applied to high entropy-fingerprints, the invention's matching method demonstrates high reliability, robustness and results in low error-rate. In a preferred embodiment operating with fingerprints corresponding to approximately 10-15 seconds long audio fragments, matching of fingerprints against a set of audio fragments originating from different music recordings and containing a few millions of fingerprints results in a very high accuracy with an average error-rate of <0.001% (less than one error per 100000 audio fragments).

In some embodiments, the previously discussed timeless fingerprint techniques can be further used in to numerically calculate a degree of acoustic similarity of a first and a second audio sample. This can be done by:

a: using at least one computer processor to split the first audio sample into a set of first sample fragments, and also split the second audio sample into a set of second sample fragments. Here the first and second audio samples and will typically have a time duration of at least 3 seconds.

b: using at least one computer processor to produce a set of first audio sample timeless fingerprints by using acoustic properties of all the first sample fragments and computing a set of first acoustic sub-fingerprints, then selecting and combining these first acoustic sub-fingerprints in an arbitrary order. Similarly, this computer processor will also produce a set of second audio sample timeless fingerprints by using acoustic properties of all the second sample fragments by computing a set of second acoustic sub-fingerprints, and then selecting and combining these second acoustic sub-fingerprints in an arbitrary order.

c: using at least one computer processor to produce a first timeless super-fingerprint by selecting at least some first audio sample timeless fingerprints from the set of first audio sample timeless fingerprints, and combining them in an arbitrary order. Similarly, using the computer processor to produce a second timeless super-fingerprint by selecting at least some second audio sample timeless fingerprints from the set of second audio sample timeless fingerprints, and combining them in an arbitrary order.

d: using at least one computer processor to match the first and second timeless super-fingerprints by paring first audio sample timeless fingerprints from the first timeless super-fingerprint, with second audio sample timeless fingerprints from the second timeless super-fingerprint, thus producing plurality of fingerprint pairs. Then, for each fingerprint pair in the plurality of fingerprint pairs, using the computer processor(s) to calculate how many identical sub-fingerprints (hits) are contained in both fingerprint pairs, thus producing a hit-list.

e: using at least one computer processor to calculate, using this hit-list, a degree of acoustic similarity of the first and second audio samples.

Note that in the above discussion, in at least some embodiments, the relative positions and temporal relations of any of said sub-fingerprints comprising any of said timeless fingerprints will often be unknown. Further these sub-fingerprints will often not carry temporal information about their location within any corresponding sample fragments of any said audio samples. Additionally, the relative positions and temporal relations of any of said timeless fingerprints in any of said timeless super-fingerprints will often also be unknown. Finally, the timeless fingerprints in any of said timeless super-fingerprints will typically not carry temporal information about their location relative to the other timeless fingerprints of other said timeless super-fingerprints.

Figure 10:
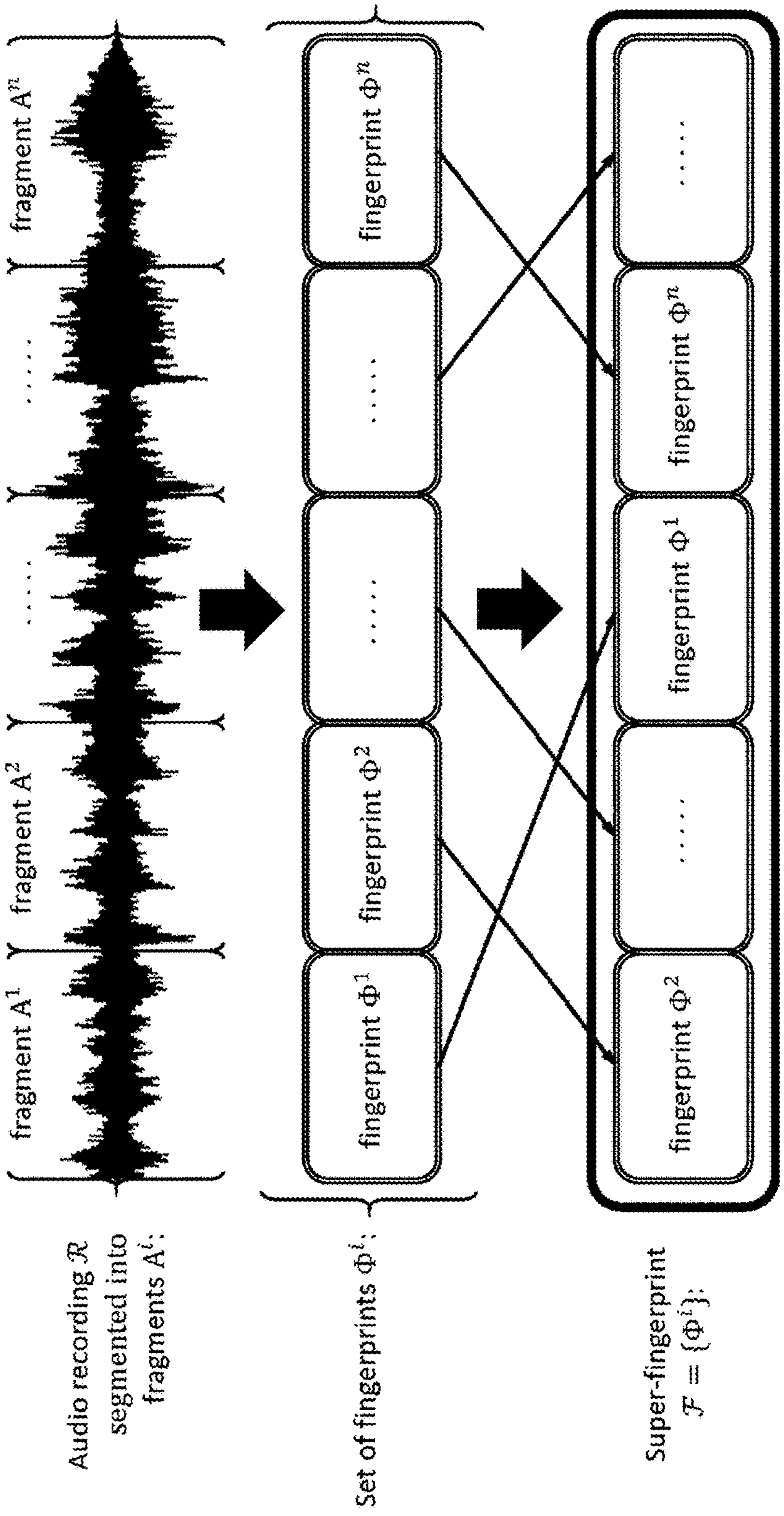
FIG. 10 shows producing super-fingerprint of a long audio recording by combining its fingerprints in arbitrary order.

More specifically, matching of long audio tracks can be done by matching their corresponding timeless "super-fingerprints". Namely, a long audio recording is first segmented into several shorter fragments (e.g. 10-15 seconds long), and timeless fingerprint is extracted from each fragment by performing procedures described hereinbefore. The fragments can be disjoint or overlapping. Timeless fingerprints originating from the same track are combined into a group of fingerprints to produce the timeless "super-fingerprint" of the long audio recording, as shown in FIG. 10. Similar to the process of producing timeless fingerprints from sub-fingerprints described hereinbefore, the timeless super-fingerprint is produced of a group of timeless fingerprints by combining them together in an arbitrary order and without adding any additional temporal information. All or only part of the available fingerprints can be used to form the super-fingerprint. For the super-fingerprint to be a representative of an audio recording, it is enough to associate the fingerprints comprising the super-fingerprint with the audio recording from which they originate by adding a short identifier associated with the recording.

In a preferred embodiment of super-fingerprint extraction, a long audio recording $\mathcal{R}$ (e.g. music track) is segmented into 10-15 seconds long fragments $A^i$ to produce a set of fragments $\mathcal{A}=\{A^i|A^i\subseteq\mathcal{R},\ \cup_i A^i=\mathcal{R}\}$ of the audio recording $\mathcal{R}$. Fingerprint $\Phi^i$ is extracted from each fragment $A^i$ of the set $\mathcal{A}$. The extracted fingerprints are merged together into one group to produce the super-fingerprint $\mathcal{F}=\{\Phi^i\}$ of the audio recording $\mathcal{R}$.

FIG. 10 depicts the process of combining several fingerprints $\Phi^i$, corresponding to fragments $A^i$ of a long audio recording $\mathcal{R}$, in arbitrary order (their original sequential order it not preserved) into one set to produce a super-fingerprint $\mathcal{F}=\{\Phi^i\}$ of the audio recording $\mathcal{R}$.

Matching of two audio recordings $\mathcal{R}_\alpha$ and $\mathcal{R}_\beta$ can be performed by matching their corresponding super-fingerprints $\mathcal{F}_\alpha$ and $\mathcal{F}_\beta$ produced from their corresponding sets of audio fragments $\mathcal{A}_\alpha$ and $\mathcal{A}_\beta$.

Matching of two super-fingerprints $\mathcal{F}_\alpha=\{\Phi_\alpha^i\}$ and $\mathcal{F}_\beta=\{\Phi_\beta^j\}$ can be done by matching pairs of fingerprints they contain, wherein the first fingerprint $\Phi_\alpha^i$ in the matched pair $(\Phi_\alpha^i,\Phi_\beta^j)$ is taken from the first super-fingerprint $\mathcal{F}_\alpha$, and the second fingerprint $\Phi_\beta^j$ in the matched pair $(\Phi_\alpha^i,\Phi_\beta^j)$ is taken from the second super-fingerprint $\mathcal{F}_\beta$. Acoustic similarity of the two audio recordings is then calculated by combining and processing the results of the pairs matching.

Various different methods can be applied to determine the degree of acoustic similarity of the two audio recordings based on matching results of their corresponding timeless fingerprint pairs In some embodiments, the degree of acoustic similarity between the audio recordings and their corresponding super-fingerprints can be calculated by performing operations such as determining if a number of hits in said hit-list exceeds a predetermined threshold; or determining if a maximal number of hits in said hit-list exceeds a predetermined threshold.

In one particular, simple embodiment, the degree of acoustic similarity D of two audio recordings $\mathcal{R}_\alpha$ and $\mathcal{R}_\beta$ is determined as $D=\max(\{d^{i,j}\})$, where $d^{i,j}$ is the degree of acoustic similarity of fingerprints in the corresponding timeless super-fingerprints $\Phi_\alpha^i\in\mathcal{F}_\alpha$ and $\Phi_\beta^j\in\mathcal{F}_\beta$ of the two audio recordings $\mathcal{R}_\alpha$ and $\mathcal{R}_\beta$.

Figure 11:
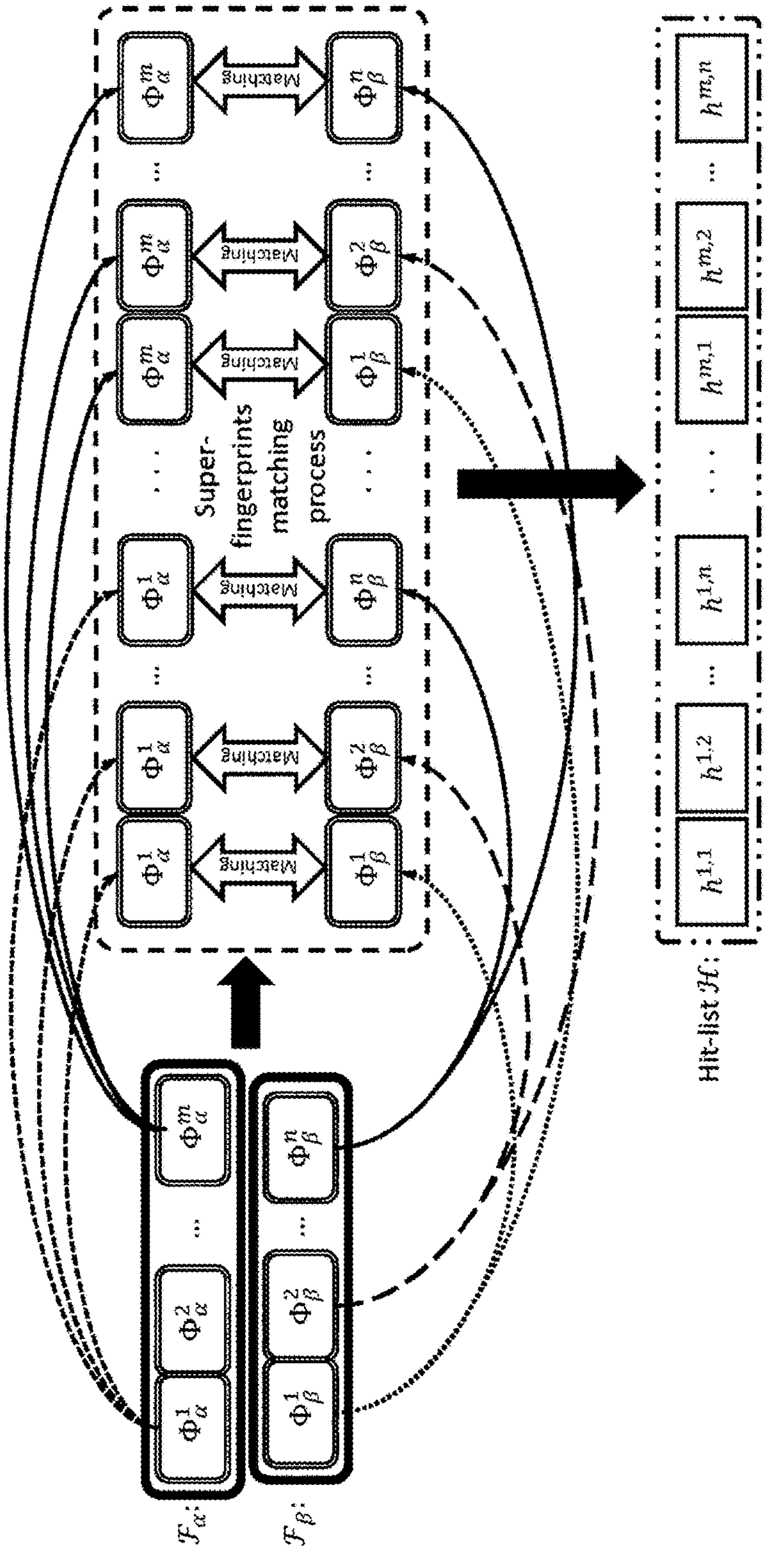
FIG. 11 Shows matching of two super-fingerprints.

In another, more sophisticated embodiment, depicted in the FIG. 11, the number of hits $h^{i,j}$ is calculated for pairs of fingerprints $\Phi_\alpha^i\in\mathcal{F}_\alpha$ and $\Phi_\beta^j\in\mathcal{F}_\beta$ ("all with all" matching), and a hit-list $$\mathcal{H}=\{h^{i,j}\}$$

is produced wherein $$h^{i,j}=|C^{i,j}|,$$

$$C^{i,j}=\{F|F\in\Phi_\alpha^i\cap\Phi_\beta^j\}$$

A normalized hit-list $\mathcal{H}'$ is then calculated as:

$$\mathcal{H}'=\left\{\frac{h^{i,j}}{\min(|\Phi_\alpha^i|,|\Phi_\beta^j|)}\ \middle|\ \Phi_\alpha^i\in\mathcal{F}_\alpha,\Phi_\beta^j\in\mathcal{F}_\beta,h^{i,j}\in\mathcal{H}\right\}$$

The degree of acoustic similarity D is then calculated from the number $\mathcal{N}$ of members in the normalized hit-list having values greater than a pre-defined threshold t, 0<t≤1 in the following way:

$$\mathcal{N}-\{h\,|\,h\in\mathcal{H}',\ h>t\},$$

$$D=\frac{|\mathcal{N}|}{|\mathcal{H}'|}$$

Put alternatively, in some embodiments, the degree of acoustic similarity can be calculated by using at least one computer processor to normalizing each value of the previously discussed hit-list by dividing this value by a total amount of sub-fingerprints contained in a shortest timeless fingerprint of a corresponding fingerprint pair related to this value. This produces thus a normalized hit-list. The at least one computer processor can further calculate an amount of (how many) positions are in this normalized hit-list where the number of hits surpasses a predetermined threshold and/or the normalized value surpasses a predetermined threshold. The computer processor can then further normalize this amount (number) of positions by a total amount (number) of values in the normalized hit-list.

In case of two identical audio recordings $\mathcal{R}_\alpha$ and $\mathcal{R}_\beta$, their corresponding super-fingerprints will contain identical fingerprints and the normalized hit-list $\mathcal{H}'$ will consist of all 1's which results in D=1.0. To the contrary, in case of two totally different audio recordings, $\mathcal{R}_\alpha\neq\mathcal{R}_\beta$, their super-fingerprints will consist of unequal fingerprints and the normalized hit-list $\mathcal{H}$ will contain all zero values resulting in D=0.0.

The invention claimed is:

1. An automated method for extracting an acoustic sub-fingerprint from an audio signal fragment, said method comprising:

using at least one computer processor to perform the steps of:

a: dividing an audio signal into a plurality of time-separated signal frames (frames) of equal time lengths of at least 0.5 seconds, wherein all frames overlap in time by at least 50% with at least one other frame, but wherein at least some frames are non-overlapping in time with other frames;

b: selecting a plurality of non-overlapping frames to produce at least one cluster of frames, each selected frame in a given cluster of frames thus being a cluster frame; wherein the minimal distance between centers of said cluster frames is equal or greater than a time-length of one frame;

c: decomposing each cluster frame into a plurality of substantially overlapping frequency bands to produce a corresponding plurality of frequency band signals, wherein said frequency bands overlap in frequency by at least 50% with at least one other frequency band, and wherein at least some frequency bands are non-adjacent frequency bands that do not overlap in frequency with other frequency bands;

d: for each cluster frame, calculating a quantitative value of a selected signal property of frequency band signals of selected frequency bands of that cluster frame, thus producing a plurality of calculated signal property values, said selected signal property being any of: average energy, peak energy, energy valley, zero crossing, and normalized energy;

e: using a feature vector algorithm and said calculated signal property values of said cluster frames to produce a feature-vector of said cluster;

f: using a sub-fingerprint algorithm to digitize said feature-vector of said cluster and produce said acoustic sub-fingerprint.

2. The method of claim 1, wherein said feature vector algorithm performs the steps of:

over at least two of said cluster frames, within individual cluster frames, selecting pairs of non-adjacent frequency bands, and calculating a difference between said calculated signal property values of said pairs of non-adjacent frequency bands, thus obtaining within-frame non-adjacent band signal property delta values;

within said individual cluster frames, combining said within-frame non-adjacent band signal property delta values to produce an individual frame delta set for said individual cluster frame;

selecting pairs of said cluster frames, each cluster frame having a position within said cluster, and using said position within said cluster to calculate derivatives of corresponding pairs of said individual frame delta sets, thus producing between-frame delta derivative values; and producing said feature-vector of said cluster by combining said between-frame delta derivative values.

3. The method of claim 1, wherein said feature vector algorithm performs the steps of:

within individual cluster frames, selecting pairs of non-adjacent frequency bands, and obtaining within-frame non-adjacent band signal property delta values by calculating differences between signal property values of said selected pairs;

within individual cluster frames, further combining a plurality of said within-frame non-adjacent band signal property delta values to produce an individual frame delta set;

within individual cluster frames, further obtaining a within-frame delta derivative value by calculating a difference between said within frame non-adjacent band signal property delta values at two positions of said individual frame delta set;

producing said feature vector by combining, over said cluster frames, said within-frame delta derivative values.

4. The method of claim 1, wherein said feature vector algorithm performs the steps of:

within individual cluster frames, selecting pairs of non-adjacent frequency bands, and obtaining within-frame non-adjacent band signal property delta values by calculating differences between their signal property values;

within individual cluster frames, further combining a plurality of said within-frame non-adjacent band signal property delta values to produce an individual frame delta set;

producing said feature vector by combining, over said cluster frames, said frame delta sets from said individual cluster frames.

5. The method of claim 1 wherein said feature-vector of said cluster comprises a vector comprising positive and negative feature-vector numeric values, and said sub-fingerprint algorithm digitizes said feature-vector of said cluster to a simplified vector of binary numbers by setting positive feature vector numeric values to 1, and other feature vector numeric values to 0, thus producing a digitized acoustic sub-fingerprint.

6. The method of claim 1, further used in an automated method for extracting a timeless fingerprint characterizing at least a fragment of an audio signal, said method comprising:

using at least one computer processor to perform the steps of:

a: dividing any of an audio signal, or a fragment of said audio signal with a time length greater than 3 seconds, into a plurality of time-overlapping signal frames (frames);

b: creating a plurality of frame clusters, each frame cluster (cluster of frames) comprising at least two non-overlapping frames; wherein each frame cluster comprises frames (cluster frames) that are disjoint, non-adjacent, and substantially spaced from other frame cluster frames;

c: selecting frame clusters, and using the method of claim 1 to compute sub-fingerprints for at least some of said selected frame clusters, thus producing a set of sub-fingerprints, wherein each selected said frame cluster produces a single sub-fingerprint;

d: removing sub-fingerprints having repetitive values from said set of sub-fingerprints, thus producing a refined set of sub-fingerprints for this plurality of frame clusters;

e: producing said timeless fingerprint by combining, in an arbitrary order, and without any additional information, at least some selected sub-fingerprints from said refined sub-fingerprint set.

7. The method of claim 6, wherein said sub-fingerprints do not carry information about a time location or position of said selected frame clusters relative to said at least a fragment of an audio signal; and wherein said sub-fingerprints do not carry information about a time location or position of said selected frame clusters relative to a time location or position of other clusters of frames used to generate other sub-fingerprints comprising said timeless fingerprint.

8. The method of claim 6 wherein said at least some selected sub-fingerprints from said refined sub-fingerprint are combined in an arbitrary manner which is independent from an order in which corresponding frame clusters of said audio signal appear in said at least a fragment of an audio signal.

9. The method of claim 6, further used in a method for numerically calculating a degree of acoustic similarity of a first and a second audio sample, said method comprising:

using at least one computer processor to perform the steps of:

a: splitting said first audio sample into a set of first sample fragments, and splitting the second audio sample into a set of second sample fragments, said first audio sample and said second audio sample having a time duration of at least 3 seconds;

b: producing a set of first audio sample timeless fingerprints by using acoustic properties of all said first sample fragments and computing a set of first acoustic sub-fingerprints, and combining selected said first acoustic sub-fingerprints in an arbitrary order;

and producing a set of second audio sample timeless fingerprints by using acoustic properties of all said second sample fragments by computing a set of second acoustic sub-fingerprints, and combining selected said second acoustic sub-fingerprints in an arbitrary order;

c: producing a first timeless super-fingerprint by selecting at least some first audio sample timeless fingerprints from said set of first audio sample timeless fingerprints, and combining them in an arbitrary order; and producing a second timeless super-fingerprint by selecting at least some second audio sample timeless fingerprints from said set of second audio sample timeless fingerprints, and combining them in an arbitrary order;

d: matching said first and second timeless super-fingerprints by paring first audio sample timeless fingerprints from said first timeless super-fingerprint with second audio sample timeless fingerprints from said second timeless super-fingerprint, thus producing plurality of fingerprint pairs, and for each fingerprint pair in said plurality of fingerprint pairs, calculating how many identical sub-fingerprints (hits) are contained in both fingerprint pairs, thus producing a hit-list;

e: calculating, using said hit-list, a degree of acoustic similarity of said first and a second audio samples.

10. The method of claim 9 wherein:

relative positions and temporal relations of any of said sub-fingerprints comprising any of said timeless fingerprints are unknown; and said sub-fingerprints do not carry temporal information about its location within any corresponding sample fragments of any said audio samples; and relative positions and temporal relations of any of said timeless fingerprints in any of said timeless super-fingerprints are unknown; and said timeless fingerprints in any of said timeless super-fingerprints do not carry temporal information about their location relative to the other timeless fingerprints of other said timeless super-fingerprints.

11. The method of claim 9, further omitting consecutive sub-fingerprints with repetitive values when combining, in step b, any of said first acoustic sub-fingerprints or said second acoustic sub-fingerprints to produce any of said first audio sample timeless fingerprints or said second audio sample timeless fingerprints.

12. The method of claim 9, further calculating said degree of acoustic similarity by determining:

if a number of hits in said hit-list exceeds a predetermined threshold; or if a maximal number of hits in said hit-list exceeds a predetermined threshold.

13. The method of claim 9, further calculating said degree of acoustic similarity by calculating a sum of hit-list values in positions wherein a number of hits exceeds a predetermined threshold.

14. The method of claim 9, further calculating said degree of acoustic similarity by:

normalizing each value of said hit-list by dividing said value by a total amount of sub-fingerprints contained in a shortest timeless fingerprint of a corresponding fingerprint pair related to said value, thus producing a normalized hit-list; and calculating a sum of selected normalized hit-list values.

15. The method of claim 9, further calculating said degree of acoustic similarity by:

normalizing each value of said hit-list by dividing said value by an amount of sub-fingerprints contained in a shortest timeless fingerprint of a corresponding fingerprint pair related to said value, thus producing a normalized hit-list; and calculating a sum of those normalized hit-list values in positions wherein a number of hits surpasses a predetermined threshold and/or a normalized value surpasses a predetermined threshold.

16. The method of claim 9, further calculating said degree of acoustic similarity by:

normalizing each value of said hit-list by dividing said value by a total amount of sub-fingerprints contained in a shortest timeless fingerprint of a corresponding fingerprint pair related to said value, thus producing a normalized hit-list;

calculating an amount of positions in said normalized hit-list where a number of hits surpasses a predetermined threshold and/or a normalized value surpasses a predetermined threshold; and normalizing said amount of positions by a total amount of values in said normalized hit-list.

17. The method of claim 9, further calculating said degree of acoustic similarity by:

normalizing each value of said hit-list by dividing said value by a total amount of sub-fingerprints contained in a shortest timeless fingerprint of a corresponding fingerprint pair related to said value, thus producing a normalized hit-list; and calculating any of a peak value, median value, and average value of selected values in said normalized hit-list.

18. An automated method for extracting a timeless fingerprint characterizing at least a fragment of an audio signal, said method comprising:

using at least one computer processor to perform the steps of:

a: dividing any of an audio signal, or a fragment of said audio signal with a time length greater than 3 seconds, into a plurality of time-overlapping signal frames (frames);

b: creating a plurality of frame clusters, each frame cluster comprising at least two non-overlapping frames; wherein each frame cluster comprises frames that are disjoint, non-adjacent, and substantially spaced from other frame cluster frames;

c: selecting frame clusters, and computing sub-fingerprints for at least some of said selected frame clusters, thus producing a set of sub-fingerprints, wherein each selected frame cluster produces a single sub-fingerprint;

d: removing sub-fingerprints having repetitive values from said set of sub-fingerprints, thus producing a refined set of sub-fingerprints for this plurality of frame clusters;

e: producing said timeless fingerprint by combining, in an arbitrary order, and without any additional information, at least some selected sub-fingerprints from said refined sub-fingerprint set.

19. A method for numerically calculating a degree of acoustic similarity of a first and a second audio sample, said method comprising:

using at least one computer processor to perform the steps of:

a: splitting said first audio sample into a set of first sample fragments, and splitting the second audio sample into a set of second sample fragments, said first audio sample and said second audio sample having a time duration of at least 3 seconds;

b: producing a set of first audio sample timeless fingerprints by using acoustic properties of all said first sample fragments to compute a set of first acoustic sub-fingerprints, and combining selected said first acoustic sub-fingerprints in an arbitrary order;

and producing a set of second audio sample timeless fingerprints by using acoustic properties of all said second sample fragments to compute a set of second acoustic sub-fingerprints, and combining selected said second acoustic sub-fingerprints in an arbitrary order;

c: producing a first timeless super-fingerprint by selecting at least some first audio sample timeless fingerprints from said set of first audio sample timeless fingerprints, and combining them in an arbitrary order;

and producing a second timeless super-fingerprint by selecting at least some second audio sample timeless fingerprints from said set of second audio sample timeless fingerprints, and combining them in an arbitrary order;

d: matching said first and second timeless super-fingerprints by paring first audio sample timeless fingerprints from said first timeless super-fingerprint with second audio sample timeless fingerprints from said second timeless super-fingerprint, thus producing plurality of fingerprint pairs, and for each fingerprint pair in said plurality of fingerprint pairs, calculating how many identical sub-fingerprints (hits) are contained in both fingerprint pairs, thus producing a hit-list;

e: calculating, using said hit-list, a degree of acoustic similarity of said first and a second audio samples.

* * * * *